Nov. 16, 1937.  G. C. FARMER  2,099,422
PNEUMATIC CLUTCH CONTROL DEVICE
Filed Jan. 9, 1936   3 Sheets-Sheet 2
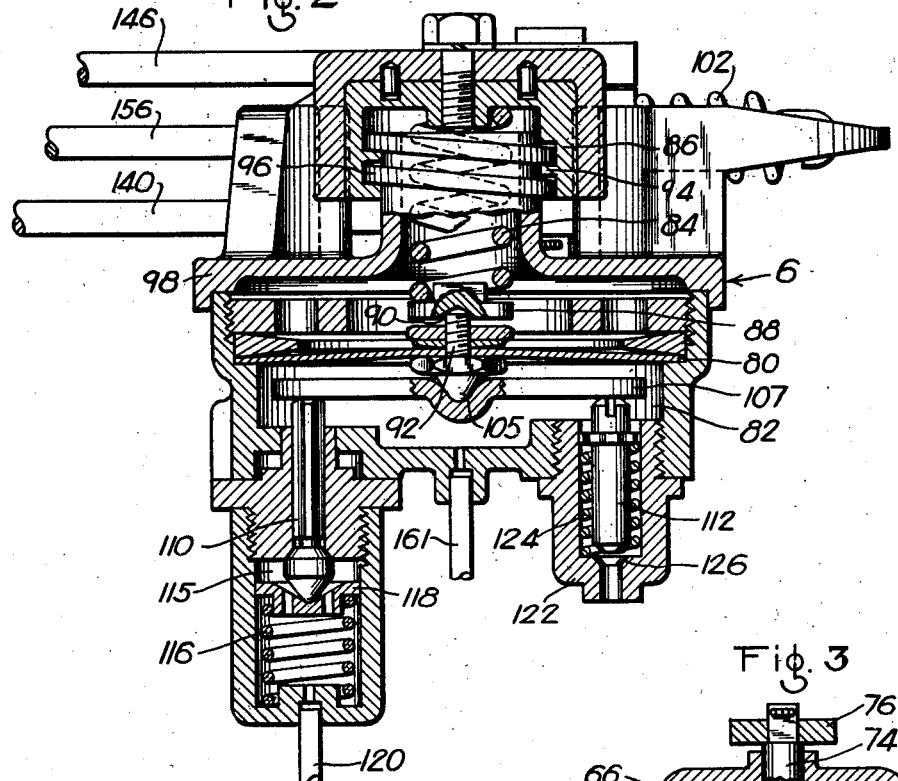
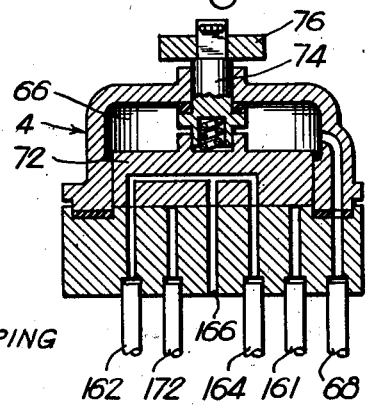
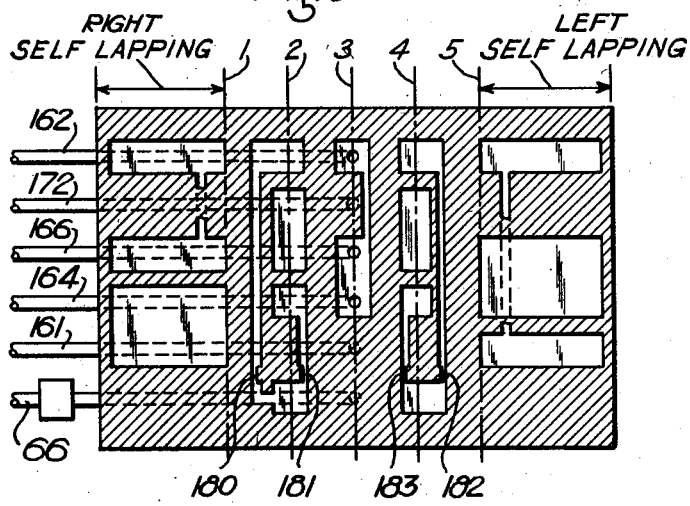
INVENTOR
GEORGE C. FARMER
BY
ATTORNEY Nov. 16, 1937.   G. C. FARMER   2,099,422
PNEUMATIC CLUTCH CONTROL DEVICE
Filed Jan. 9, 1936   3 Sheets-Sheet 3
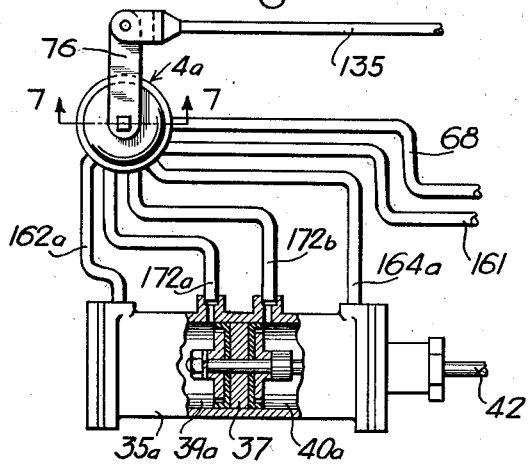
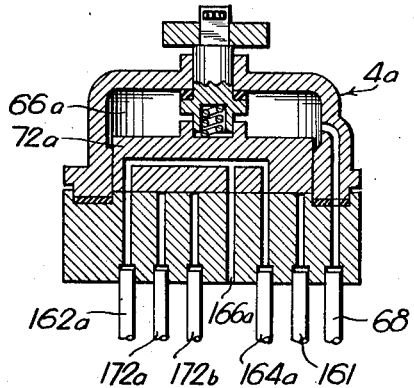
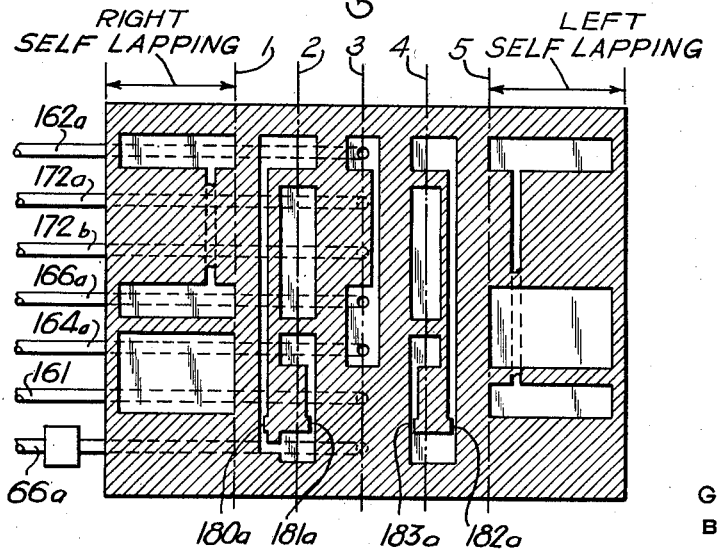
INVENTOR
GEORGE C. FARMER
BY Wm. M. Cady
ATTORNEY Patented Nov. 16, 1937

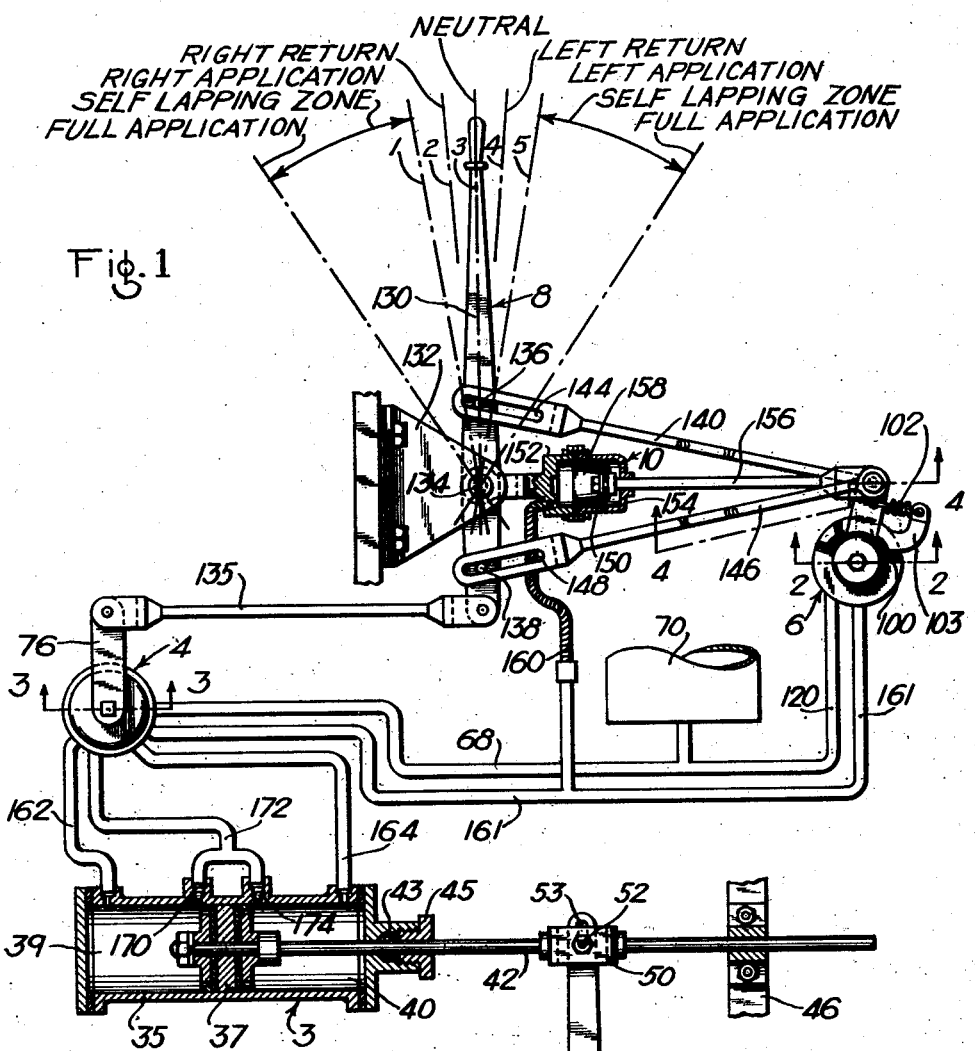
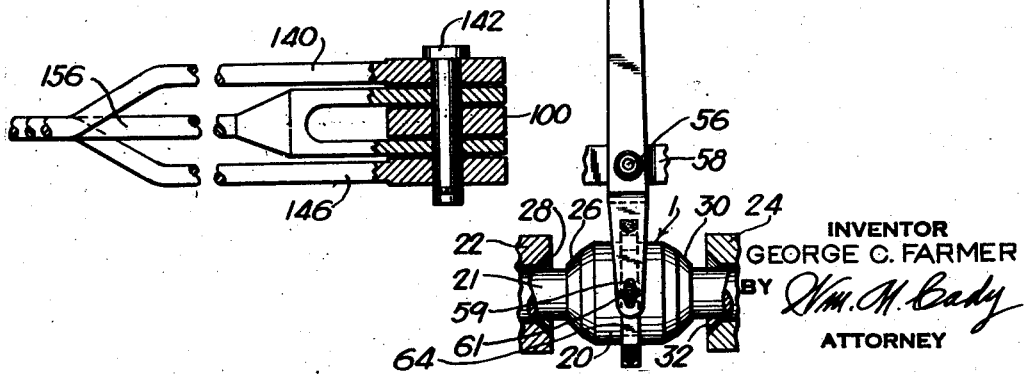

2,099,422

UNITED STATES PATENT OFFICE 2,099,422

PNEUMATIC CLUTCH CONTROL DEVICE

George C. Farmer, Chicago, Ill., assignor to The Westinghouse Air Brake Company, Wilmerding, Pa., a corporation of Pennsylvania Application January 9, 1936, Serial No. 58,352

13 Claims. (Cl. 303—6)

This invention relates to fluid pressure operated means adapted to be employed to control a clutch device.

In certain types of apparatus, such as power operated shovels, power driven means are provided to control parts of the apparatus, and, in order to control movement of these parts of the apparatus, as well as to effect movement thereof in either direction, clutch means are provided to connect the driving means to the driven means so as to drive the driven means in either direction. In order to secure flexible operation of the apparatus the clutch means may be constructed so that the rate at which the driven means is driven by the driving means may be varied by varying the force employed to effect engagement of the clutch means.

It has been proposed heretofore to employ fluid pressure operated means to effect movement of the clutch means to the driving positions, and thereby effect driving of the driven means in either direction, or to control movement of the clutch means to the neutral position, in which the driven means is not driven by the driving means.

In the systems heretofore provided, however, it is difficult or impossible to control the supply of fluid under pressure to and the release of fluid under pressure from the fluid pressure operated means so as to secure smooth or graduated engagement of the clutch means, and it is difficult or impossible, therefore, with these systems to secure smooth or accurate operation of the apparatus.

In addition, in the systems heretofore provided it is impossible for an operator to ascertain, other than by observing operation of the apparatus, the pressure of the fluid supplied to the fluid pressure operated means, and, therefore, the degree of engagement of the clutch device which is secured.

It is the principal object of this invention to provide an improved pneumatic clutch control system.

A further object of the invention is to provide an improved pneumatic clutch control system in which the pressure of the fluid supplied to the clutch actuating means may be accurately controlled or varied, whereby the degree of clutch engagement secured may be accurately graduated.

Another object of the invention is to provide an improved pneumatic clutch control system having a manual control member, and having means subject to the pressure of the fluid supplied to the clutch actuating means for opposing movement of the manual control member to its application positions, whereby the operator is constantly informed of the pressure of the fluid supplied to the clutch actuating means, and thereby is informed of the degree of clutch engagement which has been secured.

Other objects of the invention and features of novelty will be apparent from the following description taken in connection with the accompanying drawings, in which, Fig. 1 is a diagrammatic view, partly in section, of a clutch control system embodying my invention, Fig. 2 is an enlarged sectional view taken substantially along the line 2—2 of Fig. 1, Fig. 3 is an enlarged sectional view taken substantially along the line 3—3 of Fig. 1, Fig. 4 is an enlarged sectional view taken substantially along the line 4—4 of Fig. 1, Fig. 5 is a diagrammatic view of the ports in the rotary valve of the selector valve device employed in the system shown in Fig. 1, Fig. 6 is a fragmentary diagrammatic view, partly in section, of a modified form of the clutch control system embodying this invention, Fig. 7 is an enlarged sectional view taken substantially along the line 7—7 of Fig. 6, and Fig. 8 is a diagrammatic view of the ports in the rotary valve of the selector valve device employed in the system shown in Fig. 6.

Referring to Fig. 1 of the drawings, the system therein illustrated comprises a clutch device indicated generally by the reference numeral 1, fluid pressure operated clutch actuating means indicated generally by the reference numeral 3, a selector valve device 4, a pressure regulating valve device 6, manual operating means indicated generally by the reference numeral 8 for operating the selector and pressure regulating valves, and fluid pressure responsive means 10 for controlling the movement of the manual operating means.

The clutch device 1 comprises a driving member 20, mounted on a driving shaft 21, and positioned between the driven members 22 and 24, which have connected thereto apparatus, not shown, to be driven, while the driving shaft 21 is driven by suitable driving means, not shown.

The driving member 20 is secured on the driving shaft 21 so as to be rotated thereby, but also so as to be movable axially thereon. The driving member 20 has formed on one end thereof a conical friction surface 26, which is adapted to engage a complementary friction surface 28 formed on the driven member 22. The driving member 20 has formed on the other end thereof a similar conical friction surface 30 which is adapted to engage the friction surface 32 formed on the driven member 24.

The fluid pressure actuating means 3 for the clutch device comprises a cylinder 35 having a bore therein in which is mounted a piston 37, which has at one side thereof a chamber 39, and at the other side thereof a chamber 40.

The piston 37 has a piston rod 42 secured thereto and this rod extends through an end of the wall of the cylinder, the opening through which the rod extends being sealed by means of packing 43, which is held in place by means of a pack nut 45. The piston rod 42 also extends through, and is supported by, a bracket 46.

The piston rod 42 has interposed therein a yoke 50, which carries a pin 52, which extends through an elongated slot 53 in the end of the lever 55, which is pivotally supported on a bracket 58 by means of a bolt 56.

The lower end of the lever 55 is forked, and the tines of the forked portion are disposed on opposite sides of the driving member 20. The ends of the tines have elongated openings or slots 59 formed therein, through which extend the pins or bolts 61 associated with a collar 64, which is secured in an annular groove formed in the driving member 20.

The selector valve device 4 comprises a casing having a valve chamber 66 therein which is constantly connected by way of a pipe 68 with a suitable source of fluid under pressure, such as a reservoir 70. The valve chamber 66 has mounted therein a rotary valve 72 which is adapted to be operated by means of a shaft 74 having a lever 76 secured thereto.

The pressure regulating valve device 6 is of the self-lapping type and comprises a movable abutment in the form of a diaphragm 80, which is subject to the opposing pressures of the fluid in a chamber 82 and of a spring 84, one end of which engages an adjustable member 86, and the other end of which engages a spring seat 88 which has a conical recess 90 formed in the face thereof into which extends the end of a stem 92 which is secured in an opening in the center of the diaphragm 80.

The adjustable member 86 has internal threads 94 formed thereon which are adapted to cooperate with external threads 96 formed on the casing section 98. The member 86 has secured thereto a lever 100, and, as is best shown in Fig. 1 of the drawings, a tension spring 102 extends between the lever 100 and an arm 103 formed on the casing section 98 and yieldingly urges the lever 100 into engagement with a stop associated with the arm 103.

The stem 92 has a rounded end 105 formed thereon which extends into a recess formed in the lever 107 which engages the supply valve 110 and the discharge valve 112.

The supply valve 110 is mounted in a chamber 115, and is urged into engagement with its seat by means of a spring 116 acting through a spring seat 118. The chamber 115 is connected to the reservoir 70 by way of a pipe and passage 120.

The discharge valve 112 is mounted in a bore in the casing section 122 and is yieldingly urged away from its seat 126 by means of a spring 124, which is proportioned so as to be substantially weaker than the spring 116 associated with the supply valve 110.

The manual operating means 8 comprises a lever 130, which is pivotally supported on a bracket 132 by means of a pin 134, and is connected by means of a link 135 with the lever 76 of the selector valve device 4. The lever 130 has secured thereto at points on opposite sides of the pin 134, pins 136 and 138.

A link 140 has one end thereof secured to the lever 100 of the pressure regulating valve device 6 by means of a pin 142, while the other end of the link is forked or divided and the portions thereof are located on opposite sides of the lever 130 and have elongated openings or slots 144 therein into which extends the pin 136.

A link 146 has one end thereof secured to the lever 100 by means of the pin 142, and has its other end forked or divided and the portions thereof are positioned on opposite sides of the lever 130 and have elongated openings or slots 148 therein into which extends the pin 138.

The fluid pressure responsive means 10 comprises a movable abutment in the form of a diaphragm 150, which is clamped between the casing sections 152 and 154, and has secured thereto a link 156, which is connected to the lever 100 of the pressure regulating valve device 6 by means of the pin 142. The casing section 152 is pivotally supported from the bracket 132 by means of the pin 134 and cooperates with the diaphragm 150 to form a chamber 158, which is connected by way of a flexible conduit 160 with the pipe 161, which communicates with the chamber 82 of the pressure regulating valve device 6 and with a port in the seat of the rotary valve 72 of the selector valve device 4.

The apparatus is shown in Fig. 1 of the drawings in the neutral position, in which position the driving member 21 is out of engagement with the driven members 22 and 24, while the piston 37 is located adjacent the mid portion of the bore in the cylinder 35.

The operating lever 130 is shown in the neutral position, and when it is in this position, the spring 102 holds the lever 100 of the pressure regulating valve device 6 in engagement with the arm 103. When the lever 100 is in this position the spring 84 is permitted to expand to its full length, so that no pressure is exerted by this spring on the diaphragm 80, thereby permitting the spring 116 to hold the supply valve 110 in the seated position to cut off the supply of fluid under pressure to the chamber 82, and also permitting the spring 124 to hold the discharge valve 112 away from the seat 126 and thus connect the chamber 82 to the atmosphere.

When the operating lever 130 is in the neutral position the rotary valve 72 of the selector valve device 4 is held in a position in which the ports in the rotary valve establish communication between an atmospheric passage 166 and a port communicating with a pipe 162, which communicates with the chamber 39 at a point adjacent one end of the bore in the cylinder 35, and a port associated with the pipe 164, which communicates with the chamber 40 at a point adjacent the other end of the cylinder 35.

In addition, in this position of the rotary valve 72 the port in the seat of the rotary valve associated with the pipe 172 is lapped. The pipe 172 is provided with branches which communicate with the cylinder 35 at points on opposite sides of the mid portion of the cylinder. The branches of the pipe 172 have ball check valves indicated at 170 and 174 interposed therein and operative to permit fluid to flow from the cylinder to the pipe 172, and to prevent the flow of fluid from the pipe 172 to the cylinder.

The ports through which the branches of the pipe 172 communicate with the cylinder 35 are spaced apart a distance slightly greater than the thickness of the piston 37 so that when the piston is in its neutral position, it is located between these ports, and one branch of the pipe 172 communicates with the chamber on one side of the piston, while the other branch of the pipe 172 communicates with the chamber on the other side of the piston.

When it is desired to operate the clutch device so as to cause the driving member 20 to drive the driven member 24 the lever 130 is moved in a counterclockwise direction from the neutral position, which is the position indicated by the broken line identified by the numeral 3, to a point in the right application self-lapping zone. When the lever 130 is moved to this point the link 135 is moved to the right, as viewed in Fig. 1 of the drawings, and the rotary valve 72 of the selector valve device 4 is turned to a position in which a port in the rotary valve establishes communication between the pipe 161, leading from the pressure regulating valve device 6, and the pipe 164, which communicates with the chamber 40 of the cylinder 35. In addition another port in the rotary valve 72 establishes communication between the pipe 162, which communicates with the chamber 39 of the cylinder 35, and the atmospheric exhaust passage 166, while the port in the seat of the rotary valve which communicates with the pipe 172 is lapped.

On movement of the lever 130 in a counterclockwise direction, as viewed in Fig. 1 of the drawings, the pin 138 moves freely to the right in the slots 148 in the ends of the link 146, while the pin 136 moves to the left hand ends of the slots 144 in the link 140; and thereafter, on further movement of the lever 130 in a counterclockwise direction, the link 140 is moved to the left, as viewed in Fig. 1 of the drawings, and causes the lever 100 to be rotated in a counterclockwise direction against the spring 102.

On movement of the lever 100 in a counterclockwise direction the threads 94 on the adjusting member 86 advance on the threads 96 on the casing section 98, thereby causing the adjusting member 86 to compress the spring 84. When the spring 84 is compressed the diaphragm 80 is biased downwardly and the stem 92 presses upon the lever 107 and forces it downwardly.

One end of the lever 107 engages the end of the stem of the supply valve 110, which valve is held in the seated position by means of the relatively strong spring 116, while the other end of the lever 107 engages the discharge valve 112, which is held in the open position by a relatively weak spring 124. On the initial downward movement of the lever 107 the supply valve 110 remains in the seated position and the discharge valve 112 is moved against the spring 124 until the valve engages the seat 126, and cuts off communication between the chamber 82 and the atmosphere, and on further downward movement of the lever 107 the supply valve 110 is moved away from its seat against the spring 116.

Fluid under pressure from the reservoir 70 which is supplied through the pipe 120 to the chamber 116 may thereupon flow to the chamber 82, from which it flows by way of the pipe 161 to the selector valve device 4, and therefrom through the port in the rotary valve 72 to the pipe 164 which leads to the chamber 40 of the cylinder 35, and on an increase in the pressure of the fluid in this chamber the piston 37 is moved to the left as viewed in Fig. 1 of the drawings.

Fluid which is supplied to the chamber 40 flows therefrom past the ball check valve 174 to the pipe 172. Fluid which is supplied to the pipe 172 cannot flow therefrom to the chamber 39 on the other side of the piston 37 as flow in this direction is prevented by the ball check valve 170. Fluid which is supplied to the pipe 172 cannot escape therefrom to the atmosphere at this time as the port in the seat of the rotary valve is lapped, and the pressure of the fluid in the pipe 172 will build up as the pressure of the fluid in the chamber 40 increases.

On movement of the piston 37 to the left the piston rod 42 is moved, and the piston rod acting through the yoke 50 and the pin 52 causes the lever 55 to turn in a counterclockwise direction about the axis determined by the pin 56, thereby moving the lower end of the lever 55 to the right, as viewed in Fig. 1 of the drawings. The lever 55 acting through the collar 64 moves the driving member 20 on the driving shaft 21, and presses the friction surface 30 on the driving member 20 into engagement with the friction surface 32 on the driven member 24.

The rate at which the driven member 24 is driven by the driving member 20 is dependent upon the force employed to press the friction surface 30 into engagement with the friction surface 32. This force is determined by the pressure of the fluid in the chamber 40 acting on the piston 37, and the pressure of the fluid in the chamber 40 is regulated by means of the pressure regulating valve device 6.

On an increase in the pressure of the fluid in the chamber 82, which pressure will be substantially the same as the pressure in the chamber 40 of the cylinder 35, the diaphragm 80 will be moved upwardly against the spring 84. On this movement of the diaphragm 80 the supply valve 110 is moved by the spring 116 toward the seated position, and the lever 107 will be pivoted about the end of the stem 92 so as to maintain the discharge valve 112 in engagement with its seat 126.

When the pressure of the fluid in the chamber 82 has increased to a value high enough to move the diaphragm 80 against the spring 84 an amount sufficient to permit the supply valve 110 to be moved to the seated position by means of the spring 116, the supply of fluid to the chamber 82 will be cut off, thereby cutting off the further increase in the pressure of the fluid in the chamber 82, while the pressure of the fluid in this chamber will be maintained as the discharge valve 112 is in the seated position.

The pressure to which the fluid in the chamber 82 must increase in order to overcome the spring 84 depends upon the extent to which the spring 84 has been compressed, which is determined by the amount of movement of the lever 130 away from the neutral position. The farther the lever 130 is moved from the neutral position, the farther the spring 84 will be compressed and the greater will be the force exerted by the spring on the diaphragm 80, and hence the higher the pressure to which the fluid in the chamber 82 must build up before the diaphragm 80 is moved against the spring 84 an amount sufficient to permit the supply valve 110 to be moved to the seated position to cut off the supply of fluid to the chamber 82.

If, while the driving member 20 is in engagement with the driven member 24, the operator desires to increase the degree of clutch engagement he may do so by moving the lever 130 farther from the neutral position, thereby moving the link 140 farther to the left, as viewed in Fig. 1 of the drawings, and turning the lever 100 of the pressure regulating valve device 6. This causes the spring 84 to be further compressed and to overcome the opposing force of the fluid under pressure in the chamber 82 acting on the diaphragm 80, whereupon the supply valve 110 is moved against the spring 116, thus permitting fluid from the chamber 115 to flow to the chamber 82 and increase the pressure of the fluid in this chamber. When the pressure of the fluid in the chamber 82 has increased to a value such that the force exerted by the fluid on the diaphragm 80 again overcomes the opposing force of the spring 84, the diaphragm 80 will be moved against the spring 84 and the supply valve 110 will be again moved to the seated position by the spring 116 to prevent the further supply of fluid to the chamber 82.

On an increase in the pressure of the fluid in the chamber 82 a similar increase will be effected in the pressure of the fluid in the chamber 40 of the cylinder 35 as the rotary valve 72 of the selector valve device 4 maintains the communications described in detail above throughout the entire range of movement of the operating lever 130 in the right application self-lapping zone.

On an increase in the pressure of the fluid in the chamber 40 a greater force will be exerted on the piston 37 by the fluid in this chamber, and there will be a corresponding increase in the force exerted through the lever 55 to press the driving member 20 into engagement with the driven member 24.

If, while the driving member 20 is in engagement with the driven member 24, the operator desires to decrease the degree of application of the clutch device, he may do so by moving the operating lever 130 in a clockwise direction to a point in the right application self-lapping zone nearer the neutral position.

On this movement of the operating lever 130 the rotary valve 72 will be rotated somewhat, but will still maintain the communication between the pipe 162 and the atmospheric exhaust passage 166, and also between the pipe 161, leading from the pressure regulating valve device 6, and the pipe 164, communicating with the chamber 40 of the cylinder 35.

On movement of the operating lever 130 in a clockwise direction the pin 136 is moved toward the right, as viewed in Fig. 1 of the drawings, thus relieving the tension on the link 140, and thereby permitting the lever 100 to be moved in a clockwise direction by the spring 102 so as to maintain the ends of the slots 144 in engagement with the pin 136.

On this movement of the lever 100 the adjusting member 86 of the pressure regulating valve device 6 is turned on the thread 96 so as to relieve the pressure on the spring 84.

On a reduction in the pressure exerted by the spring 84 on the diaphragm 80, the fluid in the chamber 82 on the opposite side of the diaphragm 80 moves the diaphragm upwardly against the spring 84, and, on this movement of the diaphragm 80, the supply valve 110 being held in the seated position by the spring 116, the lever 107 is moved about an axis formed by the end of the stem of the supply valve 110 by the spring 124, associated with the discharge valve 112, which moves the discharge valve 112 away from the seat 126.

Fluid under pressure will thereupon be permitted to escape from the chamber 82, and also from the chamber 40 of the cylinder 35, which is connected to the chamber 82 by way of the pipes 164 and 161.

On a reduction in the pressure of the fluid in the chamber 82 to a predetermined value, dependent upon the amount of reduction in the compression of the spring 84, the force exerted by the fluid in the chamber 82 will be insufficient to maintain the diaphragm 80 against the spring 84, and the spring thereupon will move the diaphragm downwardly. On this movement of the diaphragm 80 the lever 107 will move about the axis determined by the end of the stem of the supply valve 110, which is held seated by the spring 116, and the discharge valve 112 will be moved against the spring 124 into engagement with its seat 126 to cut off the further release of fluid under pressure from the chamber 82.

As a result of the reduction in the pressure of the fluid in the chamber 40 there will be a reduction in the force exerted by this fluid on the piston 37, and there will be a corresponding reduction in the force exerted by the piston 37 through the lever 55 to hold the driving member 20 in engagement with the driven member 24.

If, while the driving member 20 is in engagement with the driven member 24, the operator desires to disengage the clutch elements and discontinue driving of the driven member 24, he may cause the driving member to be moved to the intermediate or neutral position by moving the operating lever 130 from its position in the right application self-lapping zone to the right return position, which is the position indicated by the broken line identified by the numeral 2.

On this movement of the operating lever 130, the lever 76 of the selector valve device 4 will be moved in a counterclockwise direction, and the rotary valve 72 will be moved to a position to cut off communication between the pipe 162 and the atmospheric passage 166.

In addition, at this time a port in the rotary valve 72 establishes communication between the chamber 66, which is supplied with fluid under pressure from the reservoir 70, and the pipe 164. This port has a choke 180 interposed therein to restrict the rate of flow of fluid to the pipe 164 and thereby to the chamber 40. Another port in the rotary valve 72 establishes communication between the chamber 66 and the pipe 162 in this position of the rotary valve, and this port has a choke 181 interposed therein to restrict the rate of flow of fluid to the pipe 162 and thereby to the chamber 39.

In this position of the rotary valve 72 a port therein establishes communication between pipe 172 and the atmospheric passage 166, with the result that fluid under pressure present in the chamber 40 may flow therefrom past the ball check valves 170 and 174 to the pipe 172 and thence to the atmosphere. Fluid may flow from the chamber 40 to the pipe 172 past the ball check valve 170 at this time as the piston is at the left hand end of the cylinder 35, thereby establishing communication between the chamber 40 and the pipe 172 through the passage controlled by the ball check valve 170.

As a result of the release of fluid from the chamber 40 through the pipe 172 there will be a reduction in the pressure of the fluid in the chamber 40, and this pressure will not be maintained at a substantial value by the supply of fluid thereto through the pipe 164 at this time as the flow of fluid to the pipe 164 is restricted to a very slow rate by the choke 188, and this rate is less rapid than the rate at which fluid may be released from the chamber 40 through the pipe 172.

Fluid which is supplied to the pipe 162 flows therethrough to the chamber 39, and on an increase in the pressure of fluid in this chamber the piston 37 is moved to the right, as viewed in Fig. 1 of the drawings, thereby moving the piston rod 42 to the right and causing the lever 55 to be rotated in a clockwise direction. This movement of the lever 55 causes the driving member 20 to be moved away from the driven member 24. When the piston 37 has moved to a position substantially intermediate the ends of the cylinder 35 it opens communication between the chamber 39 and the passage communicating with the branched pipe 172 and controlled by the ball check valve 170.

On movement of the piston 37 to the position to establish communication between the chamber 39 and the branched pipe 172, fluid from the chamber 39 flows past the ball check valve 170 and to the atmosphere through the pipe 172, which at this time is connected to the atmosphere through a port in the rotary valve 72 and the atmospheric passage 166.

If, after the piston 37 has moved to a position to establish communication between the chamber 39 and the branched pipe 172, the piston continues to move to the right, as viewed in Fig. 1 of the drawings, it will cut off communication between the chamber 40 and the branched pipe 172 through the passage controlled by the ball check valve 174, thereby cutting off the release of fluid under pressure from the chamber 40. As fluid under pressure is supplied to the chamber 40 at a restricted rate at this time, the pressure of the fluid in the chamber 40 will increase and will return the piston to the position intermediate the ports through which the branched pipe 172 communicates with the cylinder 35. On movement of the piston 37 to this position communication is established between the chamber 40 and the branched pipe 172 through the port controlled by the ball check valve 174, thereby releasing fluid from the chamber 40 and reducing the force tending to move the piston 37 to the left.

If the piston 37 travels too far on this return movement it will cut off communication between the chamber 39 and the branched pipe 172 through the port controlled by the ball check valve 170, and as fluid under pressure is being supplied to this chamber there will be an increase in the pressure of the fluid in the chamber 39, and the piston will be returned to the position intermediate the ports leading to the branched pipe 172, so as to establish communication between the chamber 39 and the branched pipe 172 and thereby release the fluid under pressure present in the chamber 39.

After the operating lever 130 has been in the right return position for a limited period, which is the position indicated by the broken line identified by the numeral 2, the operator then moves the lever 130 to the neutral position. On this movement of the lever 130 the rotary valve 72 of the selector valve device 4 is moved to a position to cut off communication between the chamber 66 and the pipes 162 and 164 and to establish communication between the pipe 162 and the atmospheric passage 166, and also between the pipe 164 and the atmospheric passage 166. The chambers 39 and 40 on opposite sides of the piston 37 are now both connected to atmosphere, while the pipe 172 is lapped in this position of the rotary valve 72.

In addition, on movement of the operating lever 130 from the right self-lapping application zone to a point adjacent the neutral position, the pin 136 is moved to the right, as viewed in Fig. 1 of the drawings, so as to release the link 140 and permit the spring 102 to move the lever 100 into engagement with the arm 103.

On movement of the lever 100 into engagement with the arm 103 the adjusting member 86 is rotated on the threads 96 so as to relieve the spring 84 of all compression.

On this reduction in the degree of compression of the spring 84 the diaphragm 80 is moved upwardly by the fluid under pressure in the chamber 82, and the lever 107 is thereupon moved by the spring 124, acting through the discharge valve 12, which is moved away from the seat 126. This permits the fluid in the chamber 82, and in the pipe 161, to escape to the atmosphere.

The apparatus operates in a similar manner to effect engagement of the driving member 20 with the driven member 22.

If the operator wishes to effect driving of the driven member 22 by the driving member 20 he may do so by moving the operating lever 130 in a clockwise direction to a position in the left application self-lapping zone. On this movement of the lever 130 the pin 136 moves freely in the slots 144 in the link 140, while the pin 138, after a limited amount of movement of the lever 130 in a clockwise direction, engages the ends of the slots 148 in the link 146, so that on further movement of the lever 130 the link 146 is moved to the left, as viewed in Fig. 1 of the drawings, thereby moving the lever 100 in a counter-clockwise direction against the spring 102.

This movement of the lever 100 causes the adjusting member 86 to advance on the threads 96 so as to compress the spring 84 of the pressure regulating valve device 6, and thereby cause this valve device, as described in detail above, to supply fluid under pressure to the pipe 161 at a pressure determined by the amount of movement of the lever 130 away from the neutral position.

In addition, on movement of the operating lever 130 to a position in the left application self-lapping zone the lever 76 of the selector valve device 4 is moved by means of the link 135 so as to move the rotary valve 72 to a position to establish communication between the pipe 161 which leads from the pressure regulating valve device 4, and the pipe 162 which communicates with the chamber 39 of the cylinder 35. In this position of the rotary valve 72 a port therein establishes communication between the pipe 164, which leads from the chamber 40 of the cylinder 35, and the atmospheric passage 166, while the port associated with the pipe 172 is lapped.

Fluid supplied to the chamber 39 flows therefrom past the ball check valve 170 to the pipe 172, but as the port in the seat of the rotary valve 72 to which this pipe is connected is lapped at this time fluid supplied to this pipe will not escape to the atmosphere. The flow of fluid from the pipe 172 to the chamber 40 is prevented by the ball check valve 174. On an increase in the pressure of the fluid in the chamber 39, therefore, the pressure of the fluid in the pipe 172 will build up.

On movement of the piston 37 to the right the piston rod 42 is also moved to the right and causes the lever 55 to move in a clockwise direction about the pin 56, and the lever 55, acting through the collar 64, moves the driving member 20 to the left on the driving shaft 21 and presses the friction surface 26 on the driving member 20 into engagement with the friction surface 28 on the driven member 22.

The degree of clutch engagement between the driving member 20 and the driven member 22 will depend upon the pressure of the fluid supplied by the pressure regulating valve device 6 to the chamber 39, as explained in detail above, and the degree of application may be varied by varying the degree of pressure in the chamber 39, which may be accomplished by moving the operating lever 130 towards or away from the neutral position within the left application self-lapping zone. This movement of the operating lever 130 varies the adjustment of the spring 84 of the pressure regulating valve device 6, as explained in detail above.

If while the driving member 20 is in engagement with the driven member 22 the operator desires to disengage the clutch elements and to discontinue driving of the driven member, he may cause the driving member to move to the intermediate or neutral position by moving the operating lever 130 in a counterclockwise direction from its position in the left application self-lapping zone to the left return position, which is the position indicated by the broken line identified by the numeral 4.

On movement of the operating lever 130 to the left return position the rotary valve 72 of the selector valve device 4 is moved to a position in which communication between the pipe 161 and the pipe 162 is cut off, and in which communication between the pipe 164 and the atmospheric passage 166 is also cut off.

In this position of the rotary valve 72 a port therein establishes communication between the chamber 66, which is supplied with fluid under pressure from the reservoir 70, and the pipe 162. This port has a choke 182 interposed therein to restrict the rate of flow of fluid to the pipe 162 and therethrough to the chamber 39 on the face of the piston 37. In addition, in this position of the rotary valve 72 a port therein establishes communication between the chamber 66 and the pipe 164. This port has a choke 183 interposed therein to restrict the rate of flow of fluid to the pipe 164 and therethrough to the chamber 40 on the face of the piston 37.

In addition, in this position of the rotary valve 72 a port therein establishes communication between the pipe 172 and the atmospheric passage 166, with the result that fluid under pressure present in the chamber 39 may flow past the ball check valves 170 and 174 to the pipe 172 and therefrom to the atmosphere. Fluid may flow from the chamber 39 to the pipe 172 past the ball check valve 174 at this time as the piston 37 is in the extreme right hand position, in which position communication is established between the chamber 39 and the port controlled by the ball check valve 174.

As a result of the release of fluid under pressure from the chamber 39 through the pipe 172 there will be a reduction in the pressure of the fluid in this chamber, and this pressure will not be maintained at a substantial value by the supply of fluid thereto through the pipe 162 at this time as the flow of fluid to the pipe 162 is restricted to a slow rate by the choke 182, and this rate is less rapid than the rate at which fluid may be released from the chamber 39 through the pipe 172.

Fluid which is supplied to the pipe 164 flows therethrough to the chamber 40, and on an increase in the pressure of the fluid in this chamber, the piston 37 is moved to the left, as viewed in Fig. 1 of the drawings, thereby moving the piston rod 42 to the left and causing the lever 55 to be rotated in a counterclockwise direction. This movement of the lever 55 causes the driving member 20 to be moved away from the driven member 22.

When the piston 37 has been moved to a position substantially intermediate the ends of the cylinder 35 it uncovers the passage between the chamber 40 and the pipe 172 controlled by the ball check valve 174, so as to permit fluid from the chamber 40 to flow past the ball check valve 174 to the branched pipe 172, and therefrom to the atmosphere.

If after piston 37 has moved to a position to establish communication between the chamber 40 and the branched pipe 172, the piston continues to move to the left, as viewed in Fig. 1 of the drawings, it will cut off communication between the chamber 39 and the branched pipe 172 through the passage controlled by the ball check valve 170, thereby cutting off the release of fluid under pressure from the chamber 39. As fluid under pressure is supplied to the chamber 39 at a restricted rate at this time, the pressure of the fluid in the chamber 39 will increase and the fluid in this chamber acting on the piston 37 will return the piston to the position intermediate the ports through which the branched pipe 172 communicates with the cylinder 35. On movement of the piston 37 to this position communication is established between the chamber 39 and the branched pipe 172 through the port controlled by the ball check valve 170, thereby permitting fluid from the chamber 39 to escape to the atmosphere by way of the pipe 172, thus reducing the force tending to move the piston 37 to the right.

If the piston 37 travels too far on this return movement it will cut off communication between the chamber 40 and the branched pipe 172 through the port controlled by the ball check valve 174, and, as fluid under pressure is being supplied to this chamber, there will be an increase in the pressure of the fluid in the chamber 40 and the piston 37 will be returned to the position intermediate the ports leading to the branched pipe 172, so as to establish communication between the chamber 40 and the branched pipe 172 and thereby permit the fluid in the chamber 40 to escape to the atmosphere through the pipe 172.

After the operating lever 130 has been in the left return position for a short time it is moved to the neutral position, and on this movement of the lever 130 the rotary valve 72 is returned to the position in which it is shown in Fig. 3 of the drawings, in which position ports in the rotary valve establish communication between the pipe 162, and the pipe 164, and the atmospheric passage 166 so as to connect the chambers on opposite sides of the piston 37 to the atmosphere.

On movement of the lever 130 to a position adjacent the neutral position the lever 100 of the pressure regulating valve device 6 is moved by the spring 102 into engagement with the arm 103, in which position of the lever 103 all pressure on the spring 84 is relieved, with the result that the valve device 6 operates, as described in detail above, to release the fluid under pressure present in the chamber 82 and in the pipe 161.

The clutch control device provided by this invention incorporates means to keep the operator constantly informed of the pressure of the fluid supplied by the pressure regulating valve device 6 to the cylinder 35 to effect engagement of the clutch means, and thereby inform the operator of the degree of clutch engagement secured. This means comprises the fluid pressure responsive means 10, which is subject to the pressure of fluid supplied by the pressure regulating valve device 6 to the cylinder 35 to effect engagement of the clutch means.

On the supply of fluid under pressure to the pipe 161 fluid flows therefrom by way of the flexible conduit 160 to the chamber 158 and presses the diaphragm 150 to the right, as viewed in Fig. 1 of the drawings. The force exerted by the fluid in the chamber 158 on the diaphragm 150 is transmitted through the link 156 to the pin 142 and urges this pin in a clockwise direction.

The force exerted on the pin 142 is transmitted through one of the links 140 or 146, depending upon the position of the operating lever 130, to the operating lever 130, and tends to move this lever towards the neutral position.

The force exerted by the fluid under pressure in the chamber 158 on the diaphragm 150 will vary in accordance with the pressure of the fluid supplied to the pipe 161, and the operator is, therefore, constantly informed of the pressure conditions present in the cylinder 35.

In Figs. 6 to 8 inclusive of the drawings, there is illustrated, in part, a modified form of the equipment embodying this invention. This equipment is similar to that shown in Fig. 1 of the drawings, but differs from that shown in Fig. 1 of the drawings in that in place of the branched pipe 172 employed in the equipment shown in Fig. 1, separate pipes 172a and 172b are employed, and each of these pipes is connected to a port in the seat of the rotary valve 72a of the selector valve device 4a.

The pipes 172a and 172b communicate with the bore in the cylinder 35a through ports which are located adjacent the mid portion of the cylinder and are spaced apart a distance slightly greater than the thickness of the piston 37. This embodiment of the invention does not employ check valves to prevent back flow of fluid from the pipes 172a and 172b to cylinder 35a.

The other parts of this system, not shown in the drawings, are identical with the corresponding parts employed in the system shown in Fig. 1 of the drawings.

In the system shown in Fig. 6 of the drawings, when the operating lever 130 is in the neutral position, the rotary valve 72a of the selector valve device 4a is in a position in which a port therein establishes communication between the pipes 162a and 164a and an atmospheric passage 166a. The pipe 162a communicates with the chamber 39a on one side of the piston 37, while the pipe 164a communicates with the chamber 40a on the other side of the piston 37. As the pipes 162a and 164a are connected to atmosphere, the chambers 39a and 40a on opposite sides of the piston 37 are connected to atmosphere.

When the operating lever 130 is in the neutral position the rotary valve 72a laps the ports associated with the pipes 172a and 172b.

When the operating lever 130 is moved to the right application self-lapping zone the rotary valve 72a is turned to a position in which it laps the ports associated with the pipes 172a and 172b, and in which a port in the rotary valve establishes communication between the port associated with the pipe 162a and the atmospheric passage 166a. In addition, on movement of the rotary valve 72a to this position a port in the rotary valve establishes communication between the pipe 161, leading from the pressure regulating valve device 6, and the pipe 164a, leading to the chamber 40a of the cylinder 35a.

On movement of the operating lever 130 to a point in the right application self-lapping zone the pressure regulating valve device 6 is conditioned, as described in detail in connection with the system shown in Fig. 1, to supply fluid under pressure to the pipe 161 at a pressure determined by the extent of movement of the operating lever 130 away from the neutral position.

Fluid under pressure thereupon flows from the pipe 161 to the pipe 164a and therethrough to the chamber 40a. Fluid supplied to the chamber 40a may flow to the pipe 172b, but its flow from the pipe 172b is cut off as the port associated with this pipe is lapped by the rotary valve 72a.

On an increase in the pressure of the fluid in the chamber 40a the piston 37 moves to the left, as viewed in Fig. 6 of the drawings, to effect movement of the clutch driving member 20 into engagement with the driven member 24.

After a predetermined amount of movement of the piston 37 to the left it moves beyond the port associated with the pipe 172a, thereby establishing communication between the chamber 40 and the pipe 172a. Fluid under pressure in the chamber 40 will thereupon flow to the pipe 172a, but it cannot escape from this pipe as the port associated with this pipe is lapped by the rotary valve 72a in this position of the rotary valve.

When the operator desires to release the clutch means and to return the driven member 20 to the intermediate position he may do so by moving the operating lever 130 to the right return position, which is the position indicated in Fig. 8 by the broken line identified by the numeral 2, and on movement of the lever 130 to this position the rotary valve 72a of the selector valve device 4a is moved to a position in which a port therein establishes communication between the pipe 172b, which communicates with the chamber 40a, and the atmospheric passage 166a, thereby releasing the fluid under pressure present in the chamber 40a, while a port in the rotary valve 72a connects the pipe 172a with the atmospheric passage 166a.

At the same time a port in the rotary valve 72a, having a choke or restricted portion 180a therein establishes communication between the chamber 66a, which is supplied with fluid under pressure from the reservoir 70, and the pipe 162a, leading to the chamber 39a, so that fluid under pressure is supplied at a restricted rate from the reservoir 70 to the chamber 39a.

In addition, in this position of the rotary valve 72a a port therein establishes communication between the chamber 66a and the pipe 164a leading to the chamber 40a on the face of the piston 37. This port has a choke 181a interposed therein to restrict the rate of flow of fluid to the pipe 164a and therethrough to the chamber 40a.

On an increase in the pressure of the fluid in the chamber 39a the piston 37 is moved to the right, thereby effecting movement of the clutch driving member 20 away from the driven member 24.

When the piston 37 moves to the position in which it is shown in Fig. 6 of the drawings it uncovers the passage between the chamber 39a and the pipe 172a so as to permit fluid to escape from the chamber 39a to the atmosphere through the pipe 172a.

If the piston 37 continues to move to the right and moves beyond the position between the ports through which the pipes 172a and 172b communicate with the bore in the cylinder 35a, the piston will cut off communication between the chamber 40a and the pipe 172b. As fluid is supplied to the chamber 40a at a restricted rate through the pipe 164a at this time the pressure of the fluid in the chamber 40a will increase and the fluid will return the piston 37 to the intermediate position in which communication is established between the chamber 40a and the pipe 172b so that the fluid in the chamber 40a is released to the atmosphere through the pipe 172b.

If the piston 37 travels too far on this return movement it will cut off communication between the chamber 39a and the pipe 172a, and as fluid is supplied to the chamber 39a at a restricted rate through the pipe 162a at this time the pressure of the fluid in the chamber 39a will increase and will move the piston 37 to the intermediate position so as to again establish communication between the chamber 39a and the pipe 172a, and thereby permit the fluid in the chamber 39a to escape to the atmosphere through the pipe 172a.

After the operating lever 130 has been in the right return position for a short time, the operator may return it to the neutral position, and on movement of the operating lever 130 to this position, the rotary valve 72a of the selector valve device 4a is turned to a position to cut off the supply of fluid under pressure from the chamber 66a to the pipes 162a and 164a and to connect the pipes 162a and 164a to the atmospheric passage 166a so that the chambers on the opposite sides of the piston 37 are connected to atmosphere.

On movement of the operating lever 130 to a position adjacent the neutral position the pressure regulating valve device 6 is conditioned to cut off the supply of fluid under pressure to the pipe 161 and to release the fluid under pressure present in this pipe as explained in detail above.

When the operator desires to move the clutch driving member 20 into engagement with the driven member 22 he may do so by moving the operating lever 130 in a clockwise direction to the left application self-lapping zone, and when the lever 130 is moved to this position the rotary valve 72a of the selector valve device 4a is turned to a position in which a port therein establishes communication between the pipe 164a and the atmospheric passage 166a, so that the chamber 40a is maintained at atmospheric pressure, while another port in the rotary valve 72a establishes communication between the pipe 161 and the pipe 162a, so that fluid under pressure supplied by the pressure regulating valve device 6, which, on movement of the operating lever 130 is conditioned to supply fluid under pressure to the pipe 161 as explained in detail above, may flow to the chamber 39a. In this position of the rotary valve 72a the ports associated with the pipe 172a and the pipe 172b are lapped.

On the supply of fluid under pressure to the chamber 39a fluid will flow therefrom to the pipe 172a, but it cannot escape to the atmosphere as the port associated with the pipe 172a is lapped by the rotary valve 72a.

On an increase in the pressure of the fluid in the chamber 39a the piston 37 moves to the right, as viewed in Fig. 6 of the drawings, and effects movement of the driving member 20 into engagement with the driven member 22.

After a predetermined amount of movement of the piston 37 to the right it moves beyond the port through which the pipe 172b communicates with the bore in the cylinder 35a, thereby establishing communication between the chamber 39a and the pipe 172b. Fluid under pressure from the chamber 39a may thereupon flow to the pipe 172b, but it cannot escape therefrom as the port associated with this pipe is lapped by the rotary valve 72a.

When the operator desires to return the driving member 20 to the intermediate position he may do so by moving the operating lever 130 to the left return position, which is the position indicated by the broken line identified by the numeral 4, and when the lever 130 is moved to this position the rotary valve 72a is moved to a position to cut off the supply of fluid from the pipe 161 to the pipe 162a leading to the chamber 39a, and also to cut off communication between the pipe 164a and the atmosphere. In this position of the rotary valve 72a a port therein establishes communication between the pipe 172a and the atmospheric passage 166a so as to release fluid under pressure from the chamber 39a to the atmosphere, while the pipe 172b is also connected to the atmospheric port 166a by a port in the rotary valve 72a, In addition, in this position of the rotary valve 72a a port therein establishes communication between the chamber 66a, which is supplied with fluid under pressure from the reservoir 70, and the pipe 162a leading to the chamber 39a. This port has a choke 182a interposed therein to restrict the rate of flow of fluid to the chamber 39a. In this position of the rotary valve 72a another port therein establishes communication between the chamber 66a and the pipe 164a leading to the chamber 40a. This port has a choke 183a interposed therein to restrict the rate of flow of fluid to the chamber 40a.

As a result of the supply of fluid under pressure to the chamber 40a the pressure of the fluid in this chamber increases and the piston 37 will be moved to the left. When this piston has moved substantially to the neutral position it establishes communication between the chamber 40a and the pipe 172b and thereby permits the fluid under pressure in the chamber 40a to escape to the atmosphere through the pipe 172b.

If the piston 37 moves beyond the position intermediate the ports through which the pipes 172a and 172b communicate with the bore in the cylinder 35a it will cut off communication between the chamber 39a and the pipe 172a. As fluid under pressure is supplied to the chamber 39a at a restricted rate through the pipe 162a at this time the pressure of the fluid in the chamber 39a will build up and the piston 37 will be returned to the intermediate or neutral position. If the piston 37 travels too far on this return movement it will cut off communication between the chamber 40a and the pipe 172b. As fluid is supplied to the chamber 40a, the pressure of the fluid in this chamber builds up when the release of fluid therefrom through the pipe 172b is cut off and the piston 37 will be returned to the position to again establish communication between the chamber 40a and the pipe 172b and permit the fluid in the chamber 40a to escape to the atmosphere.

After the operating lever 130 has been in the left return position for a short time the operator may return it to the neutral position, which is the position indicated by the broken line, which is identified by the numeral 3, and on movement of the operating lever 130 to this position the rotary valve 72a of the selector valve device 4a is turned to a position to cut off the supply of fluid from the chamber 66a to the pipes 162a and 164a, and in which ports in the rotary valve establish communication between the pipes 162a and 164a and the atmospheric passage 166a so that the chambers on opposite sides of the piston 37 are connected to the atmosphere.

In addition on movement of the operating lever 130 to a position adjacent the neutral position the pressure regulating valve device 6 is conditioned to cut off the supply of fluid under pressure to the pipe 161, and to release the fluid present in this pipe.

It will be seen that the clutch control device provided by this invention employs a selector valve device which directs the flow of fluid under pressure to either of the two chambers of the fluid pressure operated clutch actuating means, depending upon the direction of movement of the operating lever away from the neutral position. In addition, this clutch control device has a pressure regulating valve device which controls the pressure of the fluid supplied to the selected chamber of the clutch actuating means in accordance with the amount of movement of the operating lever away from the neutral position. The pressure regulating valve device makes it possible for the operator to carefully graduate or control the pressure of the fluid employed to effect engagement of the clutch device, and, therefore, enables the operator to secure smooth, gradual engagement of the clutch, and to control the degree of engagement accurately.

While two embodiments of the improved pneumatic clutch control device provided by this invention have been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a control system for a pair of friction clutch elements having associated therewith movable abutment means subject to and operated on an increase in the pressure of the fluid supplied thereto to move said clutch elements into operative engagement, said system comprising valve means for supplying fluid under pressure to said movable abutment means, said valve means having an actuating element having a normal position, the valve means being operative to supply fluid under pressure at pressures which vary in accordance with the amount of movement of the said actuating element from the normal position, a manually operable member having a normal position, means for moving the actuating element of the valve means away from its normal position in accordance with movement of the manually operable member away from its normal position, and a movable abutment subject to the pressure of the fluid supplied by the valve means and opposing movement of the manually operable member from the normal position.

2. In a control system for a pair of friction clutch elements having associated therewith movable abutment means subject to and operated on an increase in the pressure of the fluid supplied thereto to move said clutch elements into operative engagement, said system comprising valve means for supplying fluid under pressure to said movable abutment means, said valve means having an actuating element having a normal position, the valve means being operative to supply fluid under pressure at pressures which vary in accordance with the amount of movement of the said actuating element from the normal position, a manually operable member having a normal position, means for moving the actuating element of the valve means away from its normal position in accordance with movement of the manually operable member away from its normal position in either direction, and a movable abutment subject to the pressure of the fluid supplied by said valve means and opposing movement of the manually operable member away from the normal position in either direction.

3. In a control system for a pair of clutch devices each comprising a pair of friction clutch elements, said system comprising movable abutment means subject to the pressure of the fluid in chambers on opposite sides thereof, said abutment means having a normal position and being operative on movement therefrom in one direction to move the elements of one of said clutch devices into operative engagement and operative on movement therefrom in the opposite direction to move the elements of the other of the clutch devices into operative engagement, passages controlled by said abutment through which fluid may be released from said chambers to the atmosphere, a valve device having a normal position and being operative on movement from the normal position in either direction to supply fluid under pressure to said chambers at restricted rates.

4. In a control system for a pair of clutch devices each comprising a pair of friction clutch elements, said system comprising movable abutment means subject to the pressure of the fluid in chambers on opposite sides thereof, said abutment means having a normal position and being operative on movement therefrom in one direction to move the elements of one of said clutch devices into operative engagement and operative on movement therefrom in the opposite direction to move the elements of the other of the clutch devices into operative engagement, passages controlled by said abutment through which fluid may be released from said chambers to the atmosphere, a valve device having a normal position and being operative on movement therefrom in either direction to cut off communication between said passages and the atmosphere, said valve device being also operative on movement away from the normal position in one direction to supply fluid under pressure to one of said chambers, and being operative on movement away from the normal position in the other direction to supply fluid under pressure to the other of said chambers.

5. In a control apparatus for a fluid pressure system for controlling the supply and release of fluid under pressure to and from said system, a source of fluid under pressure, pressure regulating valve means for supplying fluid under pressure from said source to said system, a selector valve, a member having a normal position for operating said selector valve, the selector valve being operative on movement of said member from the normal position to establish communication between said source and said system, and being operative on a further movement of said member from the normal position to establish communication between said pressure regulating valve means and said system.

6. In a control apparatus for a fluid pressure system for controlling the supply and release of fluid under pressure to and from said system, a source of fluid under pressure, pressure regulating valve means for supplying fluid under pressure from said source to said system, a selector valve, a member having a normal position for operating said selector valve and said pressure regulating valve means, the selector valve being operative on movement of said member from the normal position to establish communication between said source and said system and being operative on a further movement of said member from the normal position to establish communication between said pressure regulating valve means and said system.

7. In combination, a cylinder having a bore therein, a piston reciprocable in said bore, spaced ports communicating with the bore in said cylinder through which fluid may be released from the cylinder, the piston controlling communication between the chambers on opposite sides thereof and said ports, and valve means for supplying fluid under pressure to the chambers on opposite sides of the piston and for controlling communication between said ports and the atmosphere.

8. In combination, a cylinder having a bore therein, a piston reciprocable in said bore, spaced ports communicating with the bore in said cylinder through which fluid may be released from the cylinder, the piston controlling communication between the chambers on opposite sides thereof and said ports, a pressure regulating valve device for supplying fluid under pressure to a passage, and valve means for establishing communication between said passage and the chambers on opposite sides of the said piston and for controlling communication between said ports and the atmosphere.

9. In combination, a cylinder having a bore therein, a piston reciprocable in said bore, spaced ports communicating with the bore in said cylinder through which fluid may be released from the cylinder, the piston controlling communication between the chambers on opposite sides of the piston and said ports, a source of fluid under pressure, a pressure regulating valve device for supplying fluid from said source to a passage, and valve means for supplying fluid from said source to the chambers on opposite sides of the piston, for supplying fluid from said passage to said chambers, and for controlling communication between said ports and the atmosphere.

10. In a control system for a fluid pressure operated device, in combination, a manual operating member having a normal position, valve means operated on movement of said member away from the normal position for suplying fluid under pressure to said device, and a movable abutment subject to the pressure of the fluid supplied by said valve means and opposing movement of said member away from the normal position.

11. In a control system for a pair of fluid pressure operated devices, in combination, a manual operating member having a normal position, valve means operative on movement of said member from the normal position in one direction to supply fluid under pressure to one of said devices, valve means operative on movement of said member from the normal position in the other direction to supply fluid under pressure to the other of said devices, and a movable abutment subject to the pressure of the fluid supplied to either of said devices and opposing movement of said member from the normal position in either direction.

12. In a control apparatus for a fluid pressure system for controlling the supply and release of fluid under pressure to and from said system, a valve device for controlling the supply of fluid under pressure, a valve for controlling communication through which said valve device supplies fluid under pressure, and a manually operable member having a normal position, said member being movable from said normal position for operating said valve and upon a movement of said member relative to said valve device for operating said valve device.

13. In a control apparatus for a fluid pressure system for controlling the supply and release of fluid under pressure to and from said system, a valve device for controlling the supply of fluid under pressure, a fulcrumed manually operable member, elements operatively connecting said valve device with said member disposed at opposite sides of the fulcrum point thereof, whereby one element is operated by said member upon movement in one direction and the other element upon movement in the opposite direction, said elements having lost motion connection with said member to permit movement of said member in one direction relative to each element.

GEORGE C. FARMER.